United States Patent
Xiao et al.

(10) Patent No.: US 12,334,973 B1
(45) Date of Patent: Jun. 17, 2025

(54) DESIGNED METHOD FOR SATELLITE NAVIGATION SIGNAL SYSTEM WITH MIXED MODULATION OF DIRECT SPREAD SPECTRUM AND FREQUENCY HOPPING

(71) Applicant: NATIONAL UNIVERSITY OF DEFENSE TECHNOLOGY, Changsha (CN)

(72) Inventors: Wei Xiao, Changsha (CN); Wenxiang Liu, Changsha (CN); Feixue Wang, Changsha (CN); Xiaozhou Ye, Changsha (CN); Pengcheng Ma, Changsha (CN); Zukun Lu, Changsha (CN); Zongnan Li, Changsha (CN); Guangfu Sun, Changsha (CN); Xiaomei Tang, Changsha (CN); Muzi Yuan, Changsha (CN); Honglei Lin, Changsha (CN); Sixin Wang, Changsha (CN)

(73) Assignee: NATIONAL UNIVERSITY OF DEFENSE TECHNOLOGY, Changsha (CN)

( * ) Notice: Subject to any disclaimer, the term of this patent is extended or adjusted under 35 U.S.C. 154(b) by 0 days.

(21) Appl. No.: 19/023,784

(22) Filed: Jan. 16, 2025

Related U.S. Application Data (63) Continuation of application No. PCT/CN2024/138743, filed on Dec. 12, 2024.

(30) Foreign Application Priority Data

Aug. 2, 2024 (CN) .......................... 202411054147.9

(51) Int. Cl.
*H04B 1/7115* (2018.01)
*H04B 1/7073* (2011.01)
(Continued)

(52) U.S. Cl.
CPC ......... *H04B 1/70735* (2013.01); *H04B 1/713* (2013.01); *H04L 25/03898* (2013.01)

(58) Field of Classification Search
CPC ................ H04B 1/70735; H04B 1/713; H04L 25/03898
See application file for complete search history.

(56) References Cited

U.S. PATENT DOCUMENTS

| | | | |
|---|---|---|---|
| 2005/0141594 A1 | 6/2005 | Smith et al. | |
| 2015/0055685 A1* | 2/2015 | Hryciuk | ................ H04B 1/713 375/136 |

(Continued)

FOREIGN PATENT DOCUMENTS

| | | |
|---|---|---|
| CN | 101571587 A | 11/2009 |
| CN | 101592725 A | 12/2009 |

(Continued)

OTHER PUBLICATIONS

Meng Sheng Yun, et al., Analysis on Evaluating the Jamming Impact on DS / FH TT & C Signals Code Tracking Performance, Telecommunication Engineering, May 31, 2013, pp. 560-564, vol. 53. No.5; doi: 10.3969/j.issn.1001-893x.2013.05.006 Claims involved: 1-6.

(Continued)

*Primary Examiner* — Walli Z Butt
(74) *Attorney, Agent, or Firm* — Pilloff Passino & Cosenza LLP; Rachel Pilloff; Sean Passino (57) ABSTRACT

A design method for a satellite navigation signal system with mixed modulation of direct spread spectrum and frequency hopping includes: modulating the spread spectrum code sequence of multipath signal components; mixing and multiplexing with the signal components corresponding to the same frequency point; forming a baseband code sequence; separating signal components corresponding to the baseband code sequence to obtain separated radio frequency signals;

(Continued)

recombining and modulating separated radio frequency signals; controlling the frequency hopping pattern by the frequency hopping code sequence if the separated radio frequency signals are authorized signals, and performing mixed frequency synthesis modulation; performing direct combined radio frequency modulation if the separated radio frequency signals are unauthorized signals, and obtaining the recombined signal component; amplifying the signal power to obtain the direct spread spectrum navigation signal.

6 Claims, 2 Drawing Sheets

(51) Int. Cl.
  *H04B 1/713* (2011.01)
  *H04L 25/03* (2006.01)

(56) References Cited

U.S. PATENT DOCUMENTS

| | | | | |
|---|---|---|---|---|
| 2015/0236751 | A1* | 8/2015 | Floch | G01C 21/20 |
| | | | | 375/136 |
| 2019/0239059 | A1* | 8/2019 | Koorapaty | H04J 11/0069 |
| 2019/0268036 | A1 | 8/2019 | Macleod | |
| 2020/0313719 | A1* | 10/2020 | Blanchard | H04B 17/336 |

FOREIGN PATENT DOCUMENTS

| | | |
|---|---|---|
| CN | 108768449 A | 11/2018 |
| CN | 109709578 A | 5/2019 |
| CN | 110730018 A | 1/2020 |
| CN | 114279444 A | 4/2022 |

OTHER PUBLICATIONS

Xuxin Zhang, et al., A Method For High-Dynamic DS-FH Signal Simulation Based on High-Order DDS, ICSAI 2017, Jan. 8, 2018, pp. 1330-1335 Claims involved: 1-6.

Retrieval report-First search dated Aug. 22, 2024 in SIPO application No. 202411054147.9.

Notification to Grant Patent Right for Invention dated Sep. 6, 2024 in SIPO application No. 202411054147.9.

* cited by examiner

DESIGNED METHOD FOR SATELLITE NAVIGATION SIGNAL SYSTEM WITH MIXED MODULATION OF DIRECT SPREAD SPECTRUM AND FREQUENCY HOPPING

CROSS-REFERENCE TO RELATED APPLICATIONS

This application is a continuation of PCT/CN2024/138743, filed on Dec. 12, 2024 and claims priority to Chinese Patent Application No. 202411054147.9, filed on Aug. 2, 2024, the contents of which are hereby incorporated by reference.

TECHNICAL FIELD

The application belongs to the fields of global satellite navigation and positioning, and in particular to a design method for a satellite navigation signal system with mixed modulation of direct spread spectrum and frequency hopping.

BACKGROUND

The anti-interference ability of satellite navigation system is determined by the signal system of navigation system and the anti-interference algorithm of navigation terminal. At the terminal level, time domain anti-interference, frequency domain anti-interference, spatial domain anti-interference and various combined anti-interference technologies have been developed and improved. On the system level, once the navigation signal system is determined, it will not be easily changed. The spread spectrum gain of the navigation signal directly determines the anti-interference ability of the signal, and the frequency points of the navigation signal are open, so the anti-interference ability of the system is largely limited by the existing navigation signal system. Traditional satellite navigation signals generally use direct sequence spread spectrum modulation to obtain higher signal gain, while frequency hopping technology is mainly used in mobile communication field to improve the anti-interference ability of communication system.

After the existing technical search, the traditional satellite navigation signal system design is mainly based on the signal system design of GPS system, combined with the design constraints and service characteristics of satellite navigation system in various countries, to design navigation signal systems of different frequency points. China application (application publication number: CN109709578A) entitled a multi-frequency point multi-valued signal constant envelope multiplexing method, which mainly determines the corresponding phase constraint expression according to the difference between the carrier frequency of the composite signal and each of the n frequencies for N independent signal components and combined with the phase lookup table to determine the corresponding phase constraint expression, so as to realize the multi-frequency point constant envelope multiplexing of the N independent signal components. China application (application publication number: CN114279444A) entitled GNSS-like indoor navigation signal system design system, which mainly designs a larger signal bandwidth on the basis of the traditional satellite navigation signal system, adopts short-period pulse design, and defines a message protocol suitable for indoor environment to realize a GNSS indoor navigation signal.

In the field of communication and navigation, there are also some researches on the mixed modulation signal of direct spread spectrum and frequency hopping. In the China application (application publication number: CN110730018A) entitled an anti-interference method for the mixed spread spectrum system of direct spread spectrum and frequency hopping, the main purpose is to process the signal of the current frequency hopping point and detect the signal state of the next frequency hopping point in advance by using the known frequency hopping pattern information, so as to realize the detection of the same frequency hopping point. China's patent application (application publication number: CN101571587A) entitled a radio navigation system with spread-frequency hopping system, which mainly uses N transmitting stations and navigation receivers (N≥3) distributed in different positions to carry out direct spread spectrum modulation and frequency hopping modulation on the navigation message in the spread-frequency hopping modulation module, and then transmits it from the antenna through a high-pass filter and a power amplifier. China application (application publication number: CN101592725A) entitled a signal generator and signal generation method of spread-hop radio navigation system discloses a navigation signal generation system of spread spectrum system which is mainly composed of encoder, direct spread spectrum modulator, direct spread spectrum pseudo-code generator, clock, frequency hopping modulator, frequency synthesizer and frequency hopping sequence generator and is applicable to the radio navigation system of the spread-hop system.

SUMMARY

Based on this, it is necessary to provide a design method for a satellite navigation signal system with mixed modulation of direct spread spectrum and frequency hopping, which may improve the anti-interference ability of satellite navigation signals.

A design method for a satellite navigation signal system with mixed modulation of direct spread spectrum and frequency hopping includes multipath signal components and the method includes:

acquiring design requirements of multipath signal components, where the design requirements of multipath signal components include: baseband code sequence generation design, signal separation and recombination design, frequency hopping modulation design and direct spread spectrum signal generation design.

The baseband code sequence generation of the multipath signal components is designed as flows: modulating a spread spectrum code sequence of the multipath signal components, followed by mixing and multiplexing with signal components corresponding to a same frequency point, and forming the baseband code sequence according to a power ratio of each path of signal components.

The signal components corresponding to the baseband code sequence are separated according to navigation signal receiving environment conditions to obtain multipath separated radio frequency signals.

Signal recombination modulation is carried out on the multipath separated radio frequency signals, where if separated radio frequency signals corresponding to a current communication path are authorized signals, a frequency hopping pattern is controlled through a frequency hopping code sequence, and a mixed frequency synthesis modulation is carried out according to a central frequency point of the frequency hopping pattern and a frequency of the authorized signals to obtain multipath modulated recombined signal components; if separated radio frequency signals corresponding to the current communication path are unauthorized signals, a direct combined radio frequency modulation is performed according to a preset signal frequency point and a frequency of the unauthorized signals to obtain multipath modulated recombined signal components.

A signal power of each path of modulated recombined signal components is amplified according to a center frequency point difference of the multipath modulated recombined signal components to obtain multipath direct spread spectrum navigation signals for transmission.

A satellite navigation signal system design system with mixed modulation of direct spread spectrum and frequency hopping includes:
- a spread spectrum primary code generation unit, used for generating a spreading code of navigation signal components and outputting the spreading code to a secondary code generation unit;
- a secondary code generation unit, used for modulating the spreading code, generating a secondary code with a slow period, and outputting the secondary code to the subcarrier modulation unit;
- a subcarrier modulation unit, used for modulating the secondary code by BOC modulation, generating a ranging code sequence, and outputting the ranging code sequence to the navigation information modulation unit;
- the navigation information modulation unit, configured to modulate the navigation message information of the ranging code sequence to obtain a modulated spread spectrum code sequence, and output the modulated spread spectrum code sequence to the frequency hopping modulation unit and the frequency synthesizer respectively;
- a frequency hopping modulation unit, used for generating a frequency hopping sequence for controlling a frequency hopping pattern through a frequency hopping sequence generator and outputting the frequency hopping sequence to a frequency synthesizer;
- the frequency synthesizer, used for performing radio frequency synthesis on the frequency hopping sequence and the modulated spread spectrum code sequence to obtain a radio frequency modulation signal, and outputting the radio frequency modulation signal to the navigation signal to be amplified to the power amplifier.

In one of embodiments, the spread spectrum primary code generation unit, the secondary code generation unit, the subcarrier modulation unit and the navigation information modulation unit adopt binary modulation, and the number of execution units is adjusted according to the design requirements of multipath signal components in different satellite navigation signal modulation generation processes.

In one of embodiments, a power amplifier is used to power amplify a radio frequency modulation signal to obtain a direct spread spectrum navigation signal and output the direct spread spectrum navigation signal to a satellite transmitting antenna.

A computer device includes a memory and a processor, where the memory stores a computer program, and when the processor executes the computer program, the following steps are realized:
- a navigation signal including multipath signal components;
- acquiring design requirements of multipath signal components, where the design requirements of multipath signal components include: baseband code sequence generation design, signal separation and recombination design, frequency hopping modulation design and direct spread spectrum signal generation design;
- designing a baseband code sequence generation of the multipath signal components as follows: modulating a spread spectrum code sequence of the multipath signal components, followed by mixing and multiplexing with signal components corresponding to a same frequency point, and forming the baseband code sequence according to a power ratio of each path of signal components;
- separating the signal components corresponding to the baseband code sequence according to navigation signal receiving environment conditions to obtain multipath separated radio frequency signals;
- carrying out signal recombination modulation on the multipath separated radio frequency signals, where if separated radio frequency signals corresponding to a current communication path are authorized signals, a frequency hopping pattern is controlled through a frequency hopping code sequence, and a mixed frequency synthesis modulation is carried out according to a central frequency point of the frequency hopping pattern and a frequency of the authorized signals to obtain multipath modulated combined signal components; if separated radio frequency signals corresponding to the current communication path are unauthorized signals, a direct combined radio frequency modulation is performed according to a preset signal frequency point and a frequency of the unauthorized signals to obtain multipath modulated recombined signal components; and
- amplifying a signal power of each path of modulated recombined signal components according to a center frequency point difference of the multipath modulated recombined signal components to obtain multipath direct spread spectrum navigation signals for transmission.

According to the design method for a satellite navigation signal system with mixed modulation of direct spread spectrum and frequency hopping, firstly, through the baseband code sequence generation design, the modulated spread spectrum code sequence of multipath signal components is mixed and multiplexed with the signal components of the same frequency point, and the baseband code sequence is generated according to the power ratio of each path of signal component, which improves the flexibility and adaptability of signal generation and meets different navigation requirements. Secondly, the signal components corresponding to the baseband code sequence are separated according to the receiving environment conditions to obtain multipath separated radio frequency signals. The separated signal is recombined and modulated, and the authorized signals and the unauthorized signals are processed respectively: for the authorized signal, the frequency hopping pattern is controlled by the frequency hopping code sequence to perform frequency synthesis modulation; for unauthorized signals, direct combined radio frequency modulation is performed according to the preset signal frequency points. This way of signal separation and recombination ensures the accurate demodulation and recombination of signals and improves the reliability and anti-interference ability of navigation signals. In addition, through frequency hopping modulation technology and combined radio frequency modulation technology, authorized signals and unauthorized signals are effectively distinguished and processed, which enhances the anti-interference ability of the system, not only improves the adaptability of the navigation system in complex environment, but also enhances the security and stability of the system. Finally, the signal power of the multipath modulated recombined signal components is amplified according to the center frequency point difference, so as to obtain multipath direct spread spectrum navigation signals for transmission, which improves the transmission intensity and coverage of the signals, ensures the stable transmission and wide coverage of the navigation signals, and thus improves the effectiveness and reliability of the navigation system. To sum up, through the whole process design of generation, separation, recombination, modulation and transmission of multipath signal components, the multiplexed satellite navigation signals are separated and recombined under the emergency conditions of satellite communication such as strong interference, and the carrier frequency of signals that need emergency frequency hopping is controlled by frequency hopping codes, which significantly improves the flexibility, adaptability and anti-interference ability of navigation signals and ensures the integrity, accuracy and stability of signals. Based on the traditional direct sequence spread spectrum navigation system, the frequency hopping signal system is introduced to fully improve the anti-interference ability of satellite navigation signals, while maintaining the advantage of high positioning accuracy of DS-SS signals under the condition of large bandwidth.

DETAILED DESCRIPTION OF THE EMBODIMENTS

In order to make the objective, technical scheme and advantages of the present application clearer, the application will be further described in detail with the attached drawings and embodiments. It should be understood that the specific embodiments described here are only for explaining the application, and are not used to limit the application.

Figure 1:
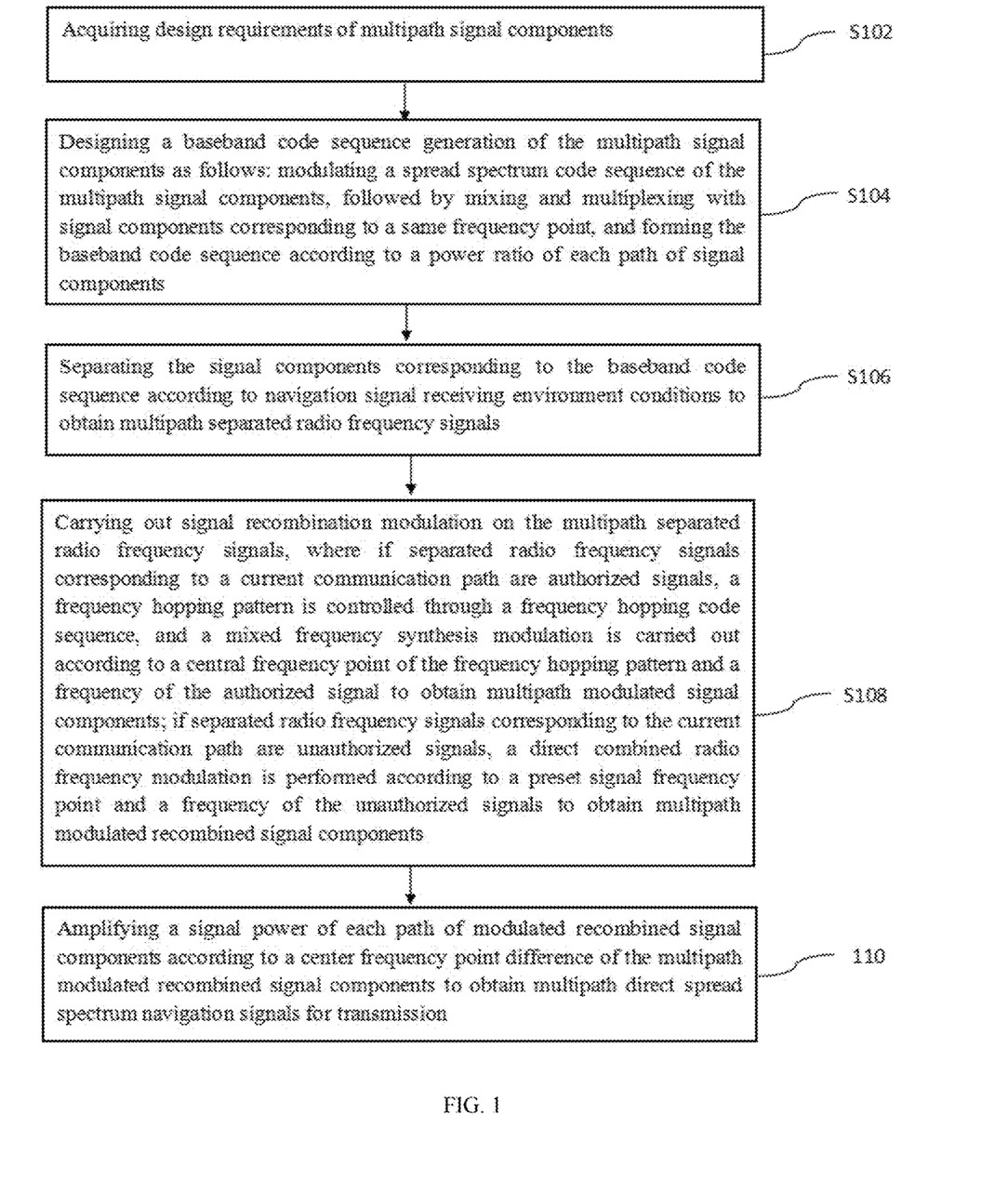
FIG. 1 is a flow chart of a design method for a satellite navigation signal system with mixed modulation of direct spread spectrum and frequency hopping in one of embodiments.

In one of embodiments, as shown in FIG. 1, the present disclosure provides a design method for a satellite navigation signal system with mixed modulation of direct spread spectrum and frequency hopping which is applicable in a satellite navigation signal system design system with mixed modulation of direct spread spectrum and frequency hopping and the design system includes:

a spread spectrum primary code generation unit, used for generating a spreading code of navigation signal components and outputting the spreading code to a secondary code generation unit; a secondary code generation unit, used for modulating the spreading code, generating a secondary code with a slow period, and outputting the secondary code to the subcarrier modulation unit; a subcarrier modulation unit, used for modulating the secondary code by BOC modulation, generating a ranging code sequence, and outputting the ranging code sequence to the navigation information modulation unit; the navigation information modulation unit, configured to modulate the navigation message information of the ranging code sequence to obtain a modulated spread spectrum code sequence, and output the modulated spread spectrum code sequence to the frequency hopping modulation unit and the frequency synthesizer respectively; a frequency hopping modulation unit, used for generating a frequency hopping sequence for controlling a frequency hopping pattern through a frequency hopping sequence generator and outputting the frequency hopping sequence to a frequency synthesizer; the frequency synthesizer, used for performing radio frequency synthesis on the frequency hopping sequence and the modulated spread spectrum code sequence to obtain a radio frequency modulation signal, and outputting the radio frequency modulation signal to the navigation signal to be amplified to the power amplifier; a power amplifier, used to power amplify a radio frequency modulation signal to obtain a direct spread spectrum navigation signal and output the direct spread spectrum navigation signal to a satellite transmitting antenna. In addition, the spread spectrum primary code generation unit, secondary code generation unit, subcarrier modulation unit and navigation information modulation unit adopt binary modulation, and the number of execution units is adjusted according to the design requirements of multipath signal components in different satellite navigation signal modulation generation processes.

The design method for a satellite navigation signal system with mixed modulation of direct spread spectrum and frequency hopping includes following steps:

S102, acquiring design requirements of multipath signal components.

The design requirements of multipath signal components include: baseband code sequence generation design, signal separation and recombination design, frequency hopping modulation design and direct spread spectrum signal generation design. The design requirements specifically include following elements:

(1) Design of spread spectrum system. At present, BPSK modulation and BOC modulation are widely used in satellite navigation signal system, both of which are based on direct sequence spread spectrum technology. BOC modulation is generally based on the original BPSK modulation, and a binary subcarrier is added to spread the BPSK signal for a second time. For simplicity, the spread spectrum system in the application adopts BPSK modulation, and adopts a spread spectrum code signal with a code rate of 2.046 Mchips/s.

(2) Frequency hopping bandwidth design. The selection of frequency band is very important for satellite navigation. It is necessary to avoid interference with existing services and ensure the service performance of navigation signals. According to ITU's frequency division rules for radio navigation satellite services, currently available navigation signal frequency resources include: 1164-1215 MHz, 1215-1300 MHZ, 1559-1610 MHz in L band, 2483.5-2500 MHz in S band, 5010-5030 MHz in C band, etc. With the application and development of Low Earth Orbit satellite navigation system, some high-frequency resources such as Ku (10.7-18.1 GHZ) band and Ka (26.5-40 GHz) band may also be used for satellite navigation in the future, which will further expand the frequency hopping range of navigation signals. For the sake of simplification, only the L band is selected for analysis, including 1231.692±67.518 MHz and 1583.604±24.552, with bandwidths of 135.036 MHz and 49.104 MHz respectively.

(3) Design of frequency hopping frequency number and frequency hopping gap. Frequency hopping gap refers to the frequency difference between two adjacent frequency hopping centers. In order to avoid spectrum aliasing between frequency hopping signals, the frequency hopping gap is 4.092 MHz, and the corresponding frequency hopping rate number is 45.

(4) Design of frequency hopping rate. Frequency hopping rate refers to the number of frequency hops per second. Generally, the higher the frequency hopping rate, the more difficult it is for the signal to be tracked. The typical medium frequency hopping rate is 100-1000 hop/s.

(5) Frequency hopping pattern design. The anti-interference performance of frequency hopping system is greatly influenced by frequency hopping pattern, and one of the key factors is to design a good frequency hopping code. In order to cover the above 45 frequency hopping frequencies, the application designs a shift register with n=6 to generate an m sequence.

S104, designing a baseband code sequence generation of the multipath signal components as follows: modulating a spread spectrum code sequence of the multipath signal components, followed by mixing and multiplexing with signal components corresponding to a same frequency point, and forming the baseband code sequence according to a power ratio of each path of signal components.

S106, separating the signal components corresponding to the baseband code sequence according to navigation signal receiving environment conditions to obtain multipath separated radio frequency signals.

S108, carrying out signal recombination modulation on the multipath separated radio frequency signals, where if separated radio frequency signals corresponding to a current communication path are authorized signals, a frequency hopping pattern is controlled through a frequency hopping code sequence, and a mixed frequency synthesis modulation is carried out according to a central frequency point of the frequency hopping pattern and a frequency of the authorized signal to obtain multipath modulated recombined signal components; if separated radio frequency signals corresponding to the current communication path are unauthorized signals, a direct combined radio frequency modulation is performed according to a preset signal frequency point and a frequency of the unauthorized signals to obtain multipath modulated recombined signal components.

Specifically, the pseudo-range residual vector is calculated to carry out signal recombination modulation on the multipath separated radio frequency signals at a preset alarm probability; if the separated radio frequency signals corresponding to the current communication path are authorized signals, the frequency hopping pattern is controlled by the frequency hopping code sequence, and the mixed frequency synthesis modulation is carried out according to the central frequency point of the frequency hopping pattern and the frequency of the authorized signals, so as to obtain the multipath modulated recombined signal components. If the separated radio frequency signal corresponding to the current communication path is an unauthorized signals, direct combined radio frequency modulation is performed according to the preset signal frequency point and the frequency of the unauthorized signals, and chi-square decentralization parameters under the condition of multipath modulated recombined signal components are obtained, and the characteristic slope of the visible satellite group is obtained according to the chi-square decentralization parameters.

S110, amplifying a signal power of each path of modulated recombined signal components according to a center frequency point difference of the multipath modulated recombined signal components to obtain multipath direct spread spectrum navigation signals for transmission.

In the design method for the satellite navigation signal system with mixed modulation of direct spread spectrum and frequency hopping, firstly, through the design of baseband code sequence generation, the modulated spread spectrum code sequence of multipath signal components is mixed and multiplexed with the signal component of the same frequency point, and the baseband code sequence is generated according to the power ratio of each signal component, thus improving the flexibility and adaptability of signal generation and meeting different navigation requirements. Secondly, the signal components corresponding to the baseband code sequence are separated according to the receiving environment conditions to obtain multipath separated radio frequency signals. The separated signal is recombined and modulated, and the authorized signals and the unauthorized signals are processed respectively: for the authorized signals, the frequency hopping pattern is controlled by the frequency hopping code sequence to perform frequency synthesis modulation; for unauthorized signals, direct combined radio frequency modulation is performed according to the preset signal frequency points. This way of signal separation and recombination ensures the accurate demodulation and recombination of signals and improves the reliability and anti-interference ability of navigation signals. In addition, through frequency hopping modulation technology and combined radio frequency modulation technology, authorized signals and unauthorized signals are effectively distinguished and processed, which enhances the anti-interference ability of the system, not only improves the adaptability of the navigation system in complex environment, but also enhances the security and stability of the system. Finally, the signal power of the multipath modulated recombined signal components is amplified according to center frequency point difference, so as to obtain multipath direct spread spectrum navigation signals for transmission, which improves the transmission intensity and coverage of the signals, ensures the stable transmission and wide coverage of the navigation signals, and thus improves the effectiveness and reliability of the navigation system. To sum up, through the whole process design of generation, separation, recombination, modulation and transmission of multipath signal components, the multiplexed satellite navigation signals are separated and recombined under the emergency conditions of satellite communication such as strong interference, and the carrier frequency of signals that need emergency frequency hopping is controlled by frequency hopping codes, which significantly improves the flexibility, adaptability and anti-interference ability of navigation signals and ensures the integrity, accuracy and stability of signals. Based on the traditional DS-SS navigation system, the frequency hopping signal system is introduced to fully improve the anti-interference ability of satellite navigation signals, while maintaining the advantage of high positioning accuracy of DS-SS signals under the condition of large bandwidth.

In one embodiment, there are military-civilian multipath signal components in the multipath signal components, and each military-civilian multipath signal component is modulated by the same or different spreading modulation modes according to the baseband attributes.

It is worth noting that because the original navigation spread spectrum signal system is retained, the ranging performance of the navigation signal itself may be maintained without losing the navigation positioning accuracy. At the same time, under the condition of multipath signal multiplexing, by maintaining the modulation mode of civil navigation signals, the normal service of civil signals in special scenes can be maintained and other risks may be avoided.

In one embodiment, after modulation, the spread spectrum code sequences of multipath signal components are mixed and multiplexed with the signal components corresponding to the same frequency point by using constant envelope modulation or non-constant envelope modulation, and a baseband code sequence is formed according to the power ratio of each path signal component.

It is worth noting that the spread spectrum primary code generation unit generates spread spectrum codes for navigation and positioning and outputs them to the secondary code generation unit. The common spread spectrum primary code rates for satellite navigation are 1.023 Mcps, 2.046 Mcps, 5.115 Mcps, 10.23 Mcps, etc. The secondary code generation unit generates a secondary code with a slower period and modulates it on the spread spectrum primary code, which may improve the cross-correlation characteristics between satellite signals and narrow-band anti-interference ability, and improve the bit synchronization ability. The spread spectrum code sequence modulated with the secondary code is output to the subcarrier modulation unit, and the common satellite navigation secondary code rates are 1 kcps, 2 kcps, etc. The subcarrier modulation unit usually adopts BOC modulation mode, including BOCc, BOCs, CBOC and other different types. After subcarrier modulation, the spread spectrum code sequence has good correlation, which may realize signal reception and ranging, and the code sequence is output to the navigation information modulation unit.

In addition, the navigation information modulation unit mainly modulates the navigation message information based on the spread spectrum code sequence, so as to facilitate the receiver to calculate the satellite position after demodulating the signal. The common satellite navigation message rates are 50 bps, 100 bps, 500 bps, etc. After binary modulation by four units, the generated spread spectrum code sequence is output to the input of frequency hopping modulation unit; The frequency hopping sequence generator is a sub-module in the frequency hopping modulation unit, which is used to generate the frequency hopping sequence that controls the frequency hopping pattern. Usually, it can be controlled by m sequence and Gold sequence, and its output end is connected to the input end of the frequency synthesizer. The frequency synthesizer mainly synthesizes the corresponding radio frequency, and its output end is connected to the input of the frequency hopping modulation unit; the output of the frequency hopping modulation unit is connected to the input of the power amplifier to realize the power amplification of the frequency hopping signal and the non-frequency hopping signal; the output of the power amplifier is connected to the input of the transmitting antenna to complete the generation and transmission of the modulated signal.

In one embodiment, a frequency hopping code sequence is set according to the frequency hopping frequency number and frequency hopping bandwidth, and the code types of the frequency hopping code sequence include: m sequence, M code, Gold code and RS sequence.

In one embodiment, the recombined signal component includes a part of the authorized signal after frequency hopping modulation and a part of the unauthorized signals without frequency hopping modulation. If the carrier frequency difference between the authorized signal after frequency hopping modulation and the unauthorized signals without frequency hopping modulation is less than the bandwidth limit of the power amplifier of the current communication path, the authorized signal after frequency hopping modulation and the unauthorized signals without frequency hopping modulation are amplified by the same power amplifier to obtain multipath direct spread spectrum navigation signals for transmission. If the carrier frequency difference between the authorized signal after frequency hopping modulation and the unauthorized signals without frequency hopping modulation is greater than or far greater than the bandwidth limit of the power amplifier of the current communication path, the authorized signal after frequency hopping modulation and the unauthorized signals without frequency hopping modulation are respectively amplified by independent power amplifiers to obtain multipath direct spread spectrum navigation signals for transmission.

It is worth noting that, due to the integration of frequency hopping signal system, the overall signal bandwidth has been expanded, and at the same time, the frequency hopping pattern may be controlled by frequency hopping code sequence, so that the central frequency point becomes more unknown to the non-cooperative party after frequency hopping, so the anti-interference ability of the signal itself or the interference cost of the interfering party may be greatly improved. In addition, there is no special requirement for the design method and signal generation structure of navigation signal system, so it has strong adaptability and is convenient to be transplanted to the existing design.

In one embodiment, multipath direct spread spectrum navigation signals may be transmitted by the same antenna or by different antennas to the target receiver.

Figure 2:
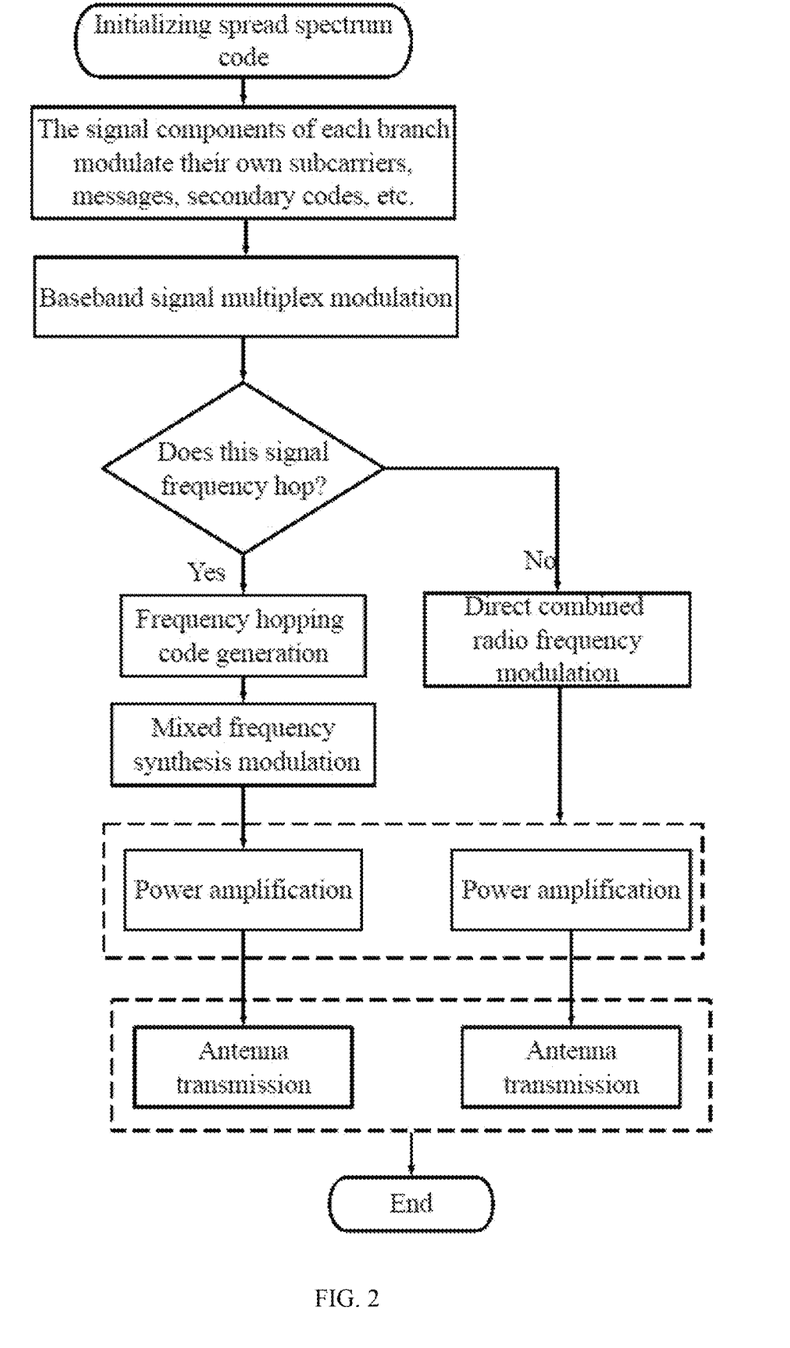
FIG. 2 is a flow diagram of a method for generating a satellite navigation signal hopping spread spectrum signal in one of embodiments.

In one embodiment, as shown in FIG. 2, in the process of satellite navigation signal hopping spread spectrum signal generation, the following steps are included:

S1: generating ranging codes for each satellite navigation signal component. The design of ranging code mainly considers its self-correlation characteristics. For the need of fast acquisition, the traditional GPS L1 C/A code adopts the Gold code with the code length of 1023, which is essentially a composite code of two m sequences. Modern GPS L1C signal uses Weil code with code length of 10230, while Galileo E1 and E6 signals use Random code. The application supports the main codes of all kinds of ranging codes mentioned above, and as one of embodiments, the Gold code is selected for explanation.

S2: generating secondary codes of each satellite navigation signal component generating. The length of the secondary code is usually short, so as to improve the correlation characteristics of the code without degrading the acquisition performance. The NH code is used as the secondary code for GPS L1C signals, while the CS code is used for Galileo E5 and E6 signals. The application supports all kinds of secondary codes mentioned above, and as an example, NH20 code is selected for explanation.

S3: generating subcarriers of each satellite navigation signal component. Typical satellite navigation subcarrier modulation signals include BOCc and BOCs signals, and the subcarrier rate is the same as the spreading code rate, usually an integer multiple of 1.023 MHz. As an embodiment of the present application, BOC (1,1) signal is selected for explanation.

S4: generating message information of each satellite navigation signal component. The message rate of traditional navigation signal is usually 50 bps, 100 bps and 500 bps, which is modulated on the ranging code of navigation signal. Modern Global Navigation Satellite System (GNSS) signals also introduce pilot paths, and navigation data are not modulated on ranging codes, which can improve the tracking ability under weak signal conditions. The embodiment of the application selects navigation messages with the same traditional GPS L1 signals.

S5: signal multiplexing modulation. The navigation signal components of each branch generated by S1-S4 are multiplexed and modulated into a combined signal component by constant envelope technology. Typical constant envelope multiplexing technologies include AltBOC, Dual-QPSK, TD-AltBOC, ACEBOC, etc. In this embodiment, Dual-QPSK modulation is selected. The L1 signal of GPS III also tries to use non-constant envelope modulation. In the future, with the maturity of on-board power amplifier technology, non-constant envelope modulation will also become an important signal multiplexing method.

S6: frequency hopping modulation of authorized signal components. For the authorized signal component, under the emergency conditions such as interference, the frequency synthesizer is controlled by the frequency hopping code generator to generate the corresponding frequency hopping pattern, thus forming the mapping relationship between the frequency hopping code and the frequency after frequency hopping, thus completing the carrier modulation of the authorized signal component after frequency hopping. For the unauthorized signal component, the carrier modulation of the unauthorized signal component is realized by following the fixed signal frequency specified by the satellite navigation ICD.

S7: navigation signal power amplification. After the multipath signal components are separated and part of the signals are frequency-hopped, the frequency-hopped signal and the non-frequency-hopped signal adopt different carrier signal frequencies, and when the difference between the carrier frequencies of the two signals is less than the bandwidth limit of the power amplifier, the two signals can still be amplified by the same power amplifier; if the carrier frequency difference between the two signals is too big, in order to ensure the efficiency of power amplifier, the two signals are amplified independently by two power amplifiers.

S8: navigation signal transmission. When the difference between the carrier frequencies of two or more signal components is less than the bandwidth limit of the transmitting antenna, two signals can still be transmitted by the same antenna; if the carrier frequency difference between the two signals is too big, it is necessary to consider using different antennas to transmit.

It should be understood that although the steps in the flowcharts of FIG. 1-FIG. 2 are shown in sequence as indicated by arrows, these steps are not necessarily executed in sequence as indicated by arrows. Unless explicitly stated in this article, the execution of these steps is not strictly limited in order, and these steps can be executed in other orders. Moreover, at least a part of the steps in FIG. 1-FIG. 2 may include multiple sub-steps or multiple stages, which may not necessarily be completed at the same time, but may be executed at different moments, and the execution order of these sub-steps or stages may not necessarily be sequentially executed, but may be alternately or alternatively executed with other steps or at least a part of sub-steps or stages of other steps.

The technical features of the above embodiments can be combined at will. In order to make the description concise, all possible combinations of the technical features in the above embodiments are not described. However, as long as there is no contradiction between the combinations of these technical features, they should be considered as the scope recorded in this specification.

The above-mentioned embodiments only express several embodiments of the application, and their descriptions are more specific and detailed, but they should not be understood as limiting the scope of application patents. It should be pointed out that for those skilled in the art, without departing from the concept of the application, a number of variations and improvements may be made, which are within the scope of protection of the application. Therefore, the scope of protection of the patent of this application should be based on the appended claims.

What is claimed is:

1. A design method for a satellite navigation signal system with mixed modulation of direct spread spectrum and frequency hopping, wherein a navigation signal comprises multipath signal components and the method comprises:

acquiring design requirements of multipath signal components, wherein the design requirements of the multipath signal components comprise: baseband code sequence generation design, signal separation and recombination design, frequency hopping modulation design and direct spread spectrum signal generation design;

designing a baseband code sequence generation of the multipath signal components as follows: modulating a spread spectrum code sequence of the multipath signal components, followed by mixing and multiplexing with signal components corresponding to a same frequency point, and forming the baseband code sequence according to a power ratio of each path of signal components;

separating the signal components corresponding to the baseband code sequence according to navigation signal receiving environment conditions to obtain multipath separated radio frequency signals;

carrying out signal recombination modulation on the multipath separated radio frequency signals, wherein if separated radio frequency signals corresponding to a current communication path are authorized signals, a frequency hopping pattern is controlled through a frequency hopping code sequence, and a mixed frequency synthesis modulation is carried out according to a central frequency point of the frequency hopping pattern and a frequency of the authorized signals to obtain multipath modulated recombined signal components; if separated radio frequency signals corresponding to the current communication path are unauthorized signals, a direct combined radio frequency modulation is performed according to a preset signal frequency point and a frequency of the unauthorized signals to obtain multipath modulated recombined signal components; and amplifying a signal power of each path of modulated recombined signal components according to a center frequency point difference of the multipath modulated recombined signal components to obtain multipath direct spread spectrum navigation signals for transmission.

2. The method according to claim 1, wherein military-civilian multipath signal components exist in the multipath signal components, and the military-civilian multipath signal components of each path are modulated by the spread spectrum code sequence in a same or different spreading modulation modes according to baseband attributes.

3. The method according to claim 1, wherein modulating the spread spectrum code sequence of the multipath signal components, followed by mixing and multiplexing with signal components corresponding to the same frequency point, and forming the baseband code sequence according to the power ratio of each path of signal components comprises:

mixing and multiplexing the spread spectrum code sequences of the multipath signal components after modulation with the signal components corresponding to the same frequency point in a constant envelope modulation mode or a non-constant envelope modulation mode, and forming the baseband code sequence according to the power ratio of each path of signal components.

4. The method according to claim 1, wherein the frequency hopping code sequence is set according to a frequency hopping frequency number and a frequency hopping bandwidth, and code types of the frequency hopping code sequence comprise: m sequence, M code, Gold code and RS sequence.

5. The method according to claim 4, wherein the recombined signal components comprise the authorized signals partially modulated by frequency hopping and the unauthorized signals partially not modulated by frequency hopping;

wherein amplifying the signal power of each path of modulated recombined signal components according to the center frequency point difference of the multipath recombined signal components to obtain multipath direct spread spectrum navigation signals for transmission comprises:

amplifying a signal power of the authorized signals after frequency hopping modulation and the unauthorized signals without frequency hopping modulation by a same power amplifier to obtain multipath direct spread spectrum navigation signals for transmission if a carrier frequency difference between the authorized signal after frequency hopping modulation and the unauthorized signals without frequency hopping modulation is less than a bandwidth limit of the power amplifier of the current communication path; respectively amplifying the signal power of the authorized signals after frequency hopping modulation and the unauthorized signals without frequency hopping modulation by an independent power amplifier to obtain multipath direct spread spectrum navigation signals for transmission if the carrier frequency difference between the authorized signal after frequency hopping modulation and the unauthorized signals without frequency hopping modulation is greater than the bandwidth limit of the power amplifier of the current communication path.

6. The method according to claim 4, wherein multiple paths of the direct spread spectrum navigation signal are transmitted by a same antenna or by different antennas to a target receiver respectively.

* * * * *